United States Patent
Eren et al.

(10) Patent No.: US 8,880,740 B2
(45) Date of Patent: Nov. 4, 2014

(54) COMPUTING DEVICE LOCATION

(75) Inventors: Selcuk S. Eren, Chapel Hill, NC (US);
Brian J. Jaeger, Raleigh, NC (US);
Douglas A. Law, Chapel Hill, NC (US);
Paul A. Roberts, Raleigh, NC (US);
Shawn K. Sremaniak, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 11/923,038

(22) Filed: Oct. 24, 2007

(65) Prior Publication Data
US 2009/0113079 A1    Apr. 30, 2009

(51) Int. Cl.
*G06F 3/00* (2006.01)
*G01S 5/02* (2010.01)
*H04W 4/02* (2009.01)
*H04L 29/08* (2006.01)

(52) U.S. Cl.
CPC ............... *G01S 5/0289* (2013.01); *H04W 4/02* (2013.01); *H04L 67/18* (2013.01); *H04L 67/125* (2013.01); *H04L 67/16* (2013.01)
USPC ............................................................ 710/1

(58) Field of Classification Search
None
See application file for complete search history.

(56) References Cited

U.S. PATENT DOCUMENTS

| | | | |
|---|---|---|---|
| 6,847,916 B1 | 1/2005 | Ying | |
| 6,978,217 B2 | 12/2005 | Morozumi et al. | |
| 2004/0176118 A1* | 9/2004 | Strittmatter et al. | 455/500 |
| 2005/0246726 A1* | 11/2005 | Labrou et al. | 719/328 |
| 2006/0064525 A1* | 3/2006 | Ahluwalia | 710/72 |
| 2007/0093291 A1* | 4/2007 | Hulvey | 463/36 |
| 2007/0111796 A1* | 5/2007 | Giaimo et al. | 463/42 |

* cited by examiner

*Primary Examiner* — Kris Rhu
(74) *Attorney, Agent, or Firm* — Steven M. Greenberg, Esq.; CRGO Law

(57) ABSTRACT

Embodiments of the present invention address deficiencies of the art in respect to computing device location and provide a novel and non-obvious method, system and computer program product for visually locating a computing device. In one embodiment of the invention, a computing device location method can include establishing filter criteria grouping different computing devices by common characteristic, wirelessly broadcasting the filter criteria in a discovery request to in range peripheral locators coupled to computing devices, aggregating a list of discovered peripheral locators meeting the filter criteria, selecting at least one of the peripheral locators in the list, and interrogating the selected peripheral locators to retrieve data provided by corresponding ones of the computing devices. Additionally, a display element in each of the discovered peripheral locators can be illuminated upon discovering the peripheral locators. Likewise, a display element can be illuminated in the selected peripheral locators upon selecting the peripheral locators.

19 Claims, 2 Drawing Sheets

COMPUTING DEVICE LOCATION

BACKGROUND OF THE INVENTION

1. Field of the Invention

The present invention relates to the field of article location and more particularly to locating computing devices within a computing environment.

2. Description of the Related Art

The modern computing environment often can be characterized by computing equipment disposed in an environmentally sound room where computing equipment can be arranged for use by end users in a production capacity, or for testing in a manufacturing capacity. The test environment for computing in manufacturing can be compared to the production environment of the data center in which an assembly area for computing equipment terminates broadband access for a computer communications network. In the latter circumstance, computing racks can be provided, with each rack typically housing several computing components on different shelves or slots defined by the rack. In both the production environment and the manufacturing environment, however, the optimization and organization of space can be very important.

In as much as computing components can be visually obscured within the manufacturing environment and the production environment of the data center where space is at a premium or practically obscured amongst many different components, tracking the location of each computing component can be a daunting, albeit necessary task. Specifically, when access to a particular computing component is required, for example in consequence of an alarm emitted by a failing computing component, a system administrator must be able to locate the failing computing component quickly. Likewise, oftentimes a selection of components in a rack are to be removed for maintenance, however, knowing which of the components in the rack are to be removed can be difficult where there are many components in the rack.

To facilitate the monitoring and management of rack mounted computing components, system management software can be deployed for use by system administrators. Whereas system management software can monitor components and alert system administrators to impending failure conditions in rack mounted computing components, system management software cannot readily locate the isolated equipment lacking network connectivity as is often the case especially in the manufacturing environment.

At present, systems administrators locate computing components in the manufacturing environment and in the production environment through manual bar coding schemes and companion databases in which bar code scans of bar codes affixed to components can be matched to a database indicating a physical location of the components in the data center. Recognizing the manual intensive nature of bar coding components, other systems administrators embed an electrical memory within each component in a rack enclosure, each memory storing identification data for the component. The rack enclosure, in turn, can incorporate complementary sensors such that the enclosure can query a proximate component to retrieve the identification data. In consequence, an end user can provide search terms through a user interface to the rack enclosure and an indicator light can illuminate near a component matching the user query.

As is often the case, within the manufacturing environment locating a specific computing device under test can be of paramount importance. For example, often a computing device must be located due to a quality hold for like products, or for emergency expedition resulting from special customer needs. Oftentimes, not just a single computing device, but an entire class of computing devices sharing similar characteristics must be located for action in the manufacturing environment or even in the production environment. In this case, at present the computing devices for the class must be located only on an individual basis and usually through manual efforts as in the manufacturing environment, the computing devices all too frequently lack power, a user interface, or network connectivity.

BRIEF SUMMARY OF THE INVENTION

Embodiments of the present invention address deficiencies of the art in respect to computing device location and provide a novel and non-obvious method, system and computer program product for visually locating a computing device. In one embodiment of the invention, a computing device location method can include establishing filter criteria grouping different computing devices by common characteristic, wirelessly broadcasting the filter criteria in a discovery request to in range peripheral locators coupled to computing devices, aggregating a list of discovered peripheral locators meeting the filter criteria, selecting at least one of the peripheral locators in the list, and interrogating the selected at least one of the peripheral locators to retrieve data provided by corresponding ones of the computing devices. Additionally, a display element in each of the discovered peripheral locators can be illuminated upon discovering the peripheral locators. Likewise, a display element can be illuminated in the selected at least one of the peripheral locators upon selecting the peripheral locators.

In another embodiment of the invention, a computing device location data processing system can be provided. The system can include peripheral locators each configured for communicative coupling to a corresponding computing device and a peripheral locator reader configured for wireless communication with the peripheral locators. The peripheral locator reader can include program code enabled to establish filter criteria grouping different computing devices by common characteristic, to wirelessly broadcast the filter criteria in a discovery request to in range ones of the peripheral locators, to aggregate a list of discovered peripheral locators meeting the filter criteria, to select at least one of the peripheral locators in the list, and to interrogate the selected peripheral locator to retrieve data provided by corresponding ones of the computing devices.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for computing device location. In accordance with an embodiment of the present invention, locatable peripherals can be communicatively coupled to corresponding computing devices. Each locatable peripheral can store identifying data for a coupled corresponding computing device and each locatable peripheral can be configured for wireless communications with a reader. In operation, a computing device filter can be established for the locatable peripherals in range and a discovery request can be provided for all locatable peripherals in range matching the filter. Filtered ones of the locatable peripherals can respond to the discovery request with a unique identifier for a coupled corresponding computing device, and in response, individual ones of the responding locatable peripherals can be selected for further interrogation.

Figure 1:
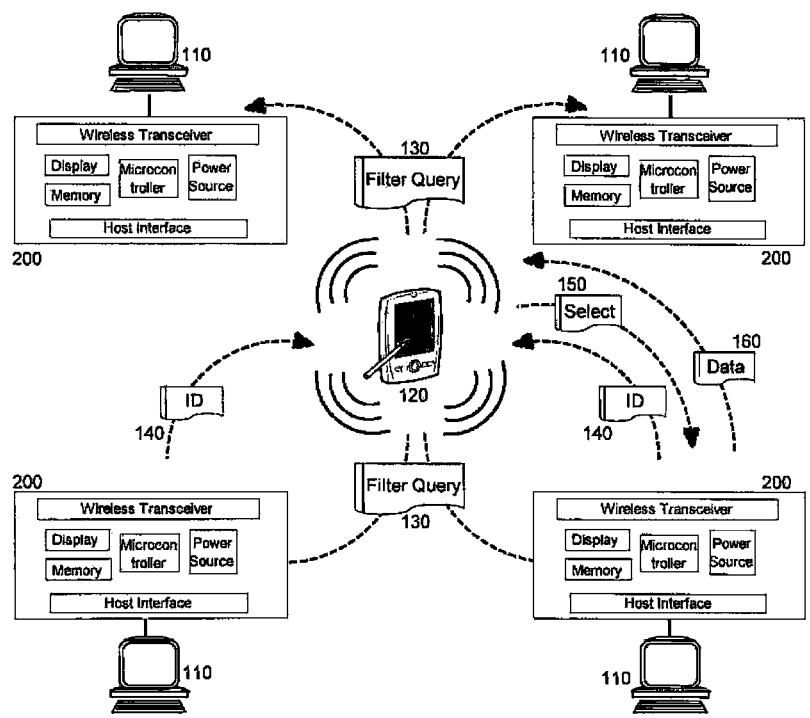
FIG. 1 is a pictorial illustration of a process for computing device location.

In illustration, FIG. 1 pictorially depicts a process for computing device location. As shown in FIG. 1, different computing devices 110 can be communicatively coupled to corresponding peripheral locators 200. Each of the computing devices 110 can be enabled to write data 160 to a corresponding one of the peripheral locators 200. Thereafter, a peripheral locator reader 120 can establish and broadcast a filter query 130 to the peripheral locators 200. The filter query 130 can specify criteria for selecting a class of computing devices 110.

In response to receiving the filter query 130, matching ones of the peripheral locators 200 can return a unique identifier 140 that can be compiled into a list of matching identifiers in the peripheral locator reader 120. In turn, individual ones of the matching identifiers in the list can be selected in the peripheral locator reader 120 and a selection notice 150 can be provided to corresponding ones of the peripheral locators 200. Upon receiving a selection notice 150, a selected one of the peripheral locators 200 can return the data 160 to the peripheral locator reader 120. In this way, different ones of the computing devices 110 can be located even where a display is not provided by the computing devices 110.

Figure 2:
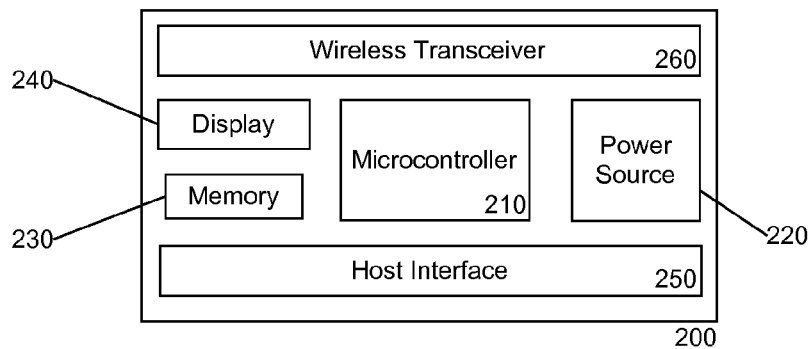
FIG. 2 is a schematic illustration of a device location peripheral configured for computing device location.

In further illustration, FIG. 2 schematic depicts a peripheral locator 200 configured for computing device location. The peripheral locator 200 can include a power source 220 powering a microcontroller 210. The microcontroller 210 can be coupled to internal memory 230 and display elements 240, for example an LED read out, each LED indicating when the peripheral locator 200 has been discovered and when the peripheral locator 200 has been selected by a peripheral locator reader (not shown). A host interface further can be provided. The host interface 250 can provide an input/output (I/O) path through which a coupled host computing device can access the memory 230 and write data thereto. As an example, the host interface 250 can include a universal serial bus (USB) interface or a simple data bus. A wireless transceiver 260 further can be coupled to the microcontroller 210.

The wireless transceiver 260 can be configured to receive wireless data requests from the peripheral locator reader and to transmit data stored in the memory 230 to the peripheral locator reader when selected by the peripheral locator reader. For example, the wireless transceiver 260 can be a passive radio frequency identification (RFID) system, a bluetooth communications system, an infrared communications system, and the like. Notably, the memory 230 can store program code enabled to respond to discovery requests received through the wireless transceiver 260 to determine whether filter queries in the requests match pre-stored data in the memory 230. If so, the program code can be further enabled to provide additionally stored data in the memory 230 provided by a coupled host computing device to an interrogating peripheral locator reader when selected by the interrogating peripheral locator reader.

Figures 3A, 3B:
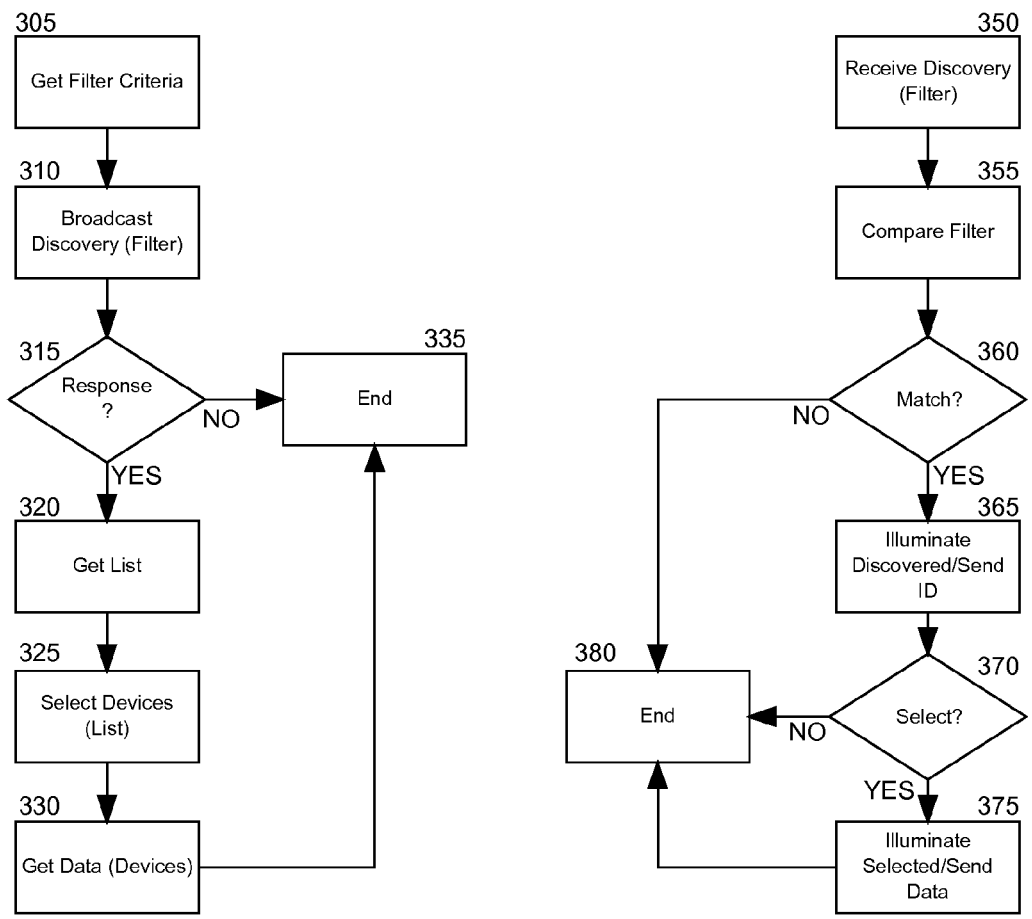
FIG. 3A is flow chart illustrating a process for locating a computing device in a device location appliance; and, FIG. 3B is a flow chart illustrating a process for locating a computing device in a device location peripheral.

In yet further illustration, FIG. 3A is flow chart illustrating a process for locating a computing device in a device location appliance. Beginning in block 305, filter criteria can be established for identifying a subset of computing devices in range of the peripheral locator reader. In block 310, a discovery request with the filter criteria can be broadcast to all peripheral locators in range. In decision block 315, it can be determined whether or not responses have been received from any peripheral locators in range. If so, in block 320 a list of responding peripheral locators can be compiled and presented in the peripheral locator reader.

In block 325, one or more of the listed peripheral locators can be selected in the peripheral locator reader. Thereafter, data in each of the selected peripheral locators corresponding to a coupled one of the computing devices can be received from the selected peripheral locators and the process can end in block 335. In this way, groups of computing devices sharing common characteristics such as common owner, device type or device status, or any combination thereof, can be wirelessly located remotely. Additionally, visual indication of location can be provided within the selected peripheral locators so as to facilitate the location of computing devices in an environment such as a manufacturing environment or a production environment.

In even yet further illustration, FIG. 3B is a flow chart illustrating a process for locating a computing device in a device location peripheral. Beginning in block 350 a discovery request from a peripheral locator reader can be received with filter criteria in a peripheral locator. In block 355, the filter criteria can be compared to pre-stored criteria such as a peripheral type, name, location, peripheral state, product code, company code, machine type/model and the like. In the event of a match in decision block 360, a display element can be illuminated in block 365 to indicate that the peripheral locator has been discovered, and also a pre-stored unique identifier can be returned to the peripheral locator reader.

In decision block 370, if the peripheral locator has received a message from the peripheral locator reader indicating the selection of the peripheral locator by the peripheral locator reader, in block 375, a display element can be illuminated to indicate that the peripheral locator has been selected. Additionally, data stored in the peripheral locator by a coupled computing device can be transmitted to the interrogating peripheral locator reader. Finally, the process can end in block 380. In consequence, different computing devices related by common status or common device owner or device type can be visually located and information pertaining to the coupled computing devices can be provided to the interrogating peripheral locator reader even though the computing devices may lack a display or though the devices can be obscured by other proximate devices.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A computing device location method comprising:
    establishing in a peripheral locator reader filter criteria grouping different computing devices by common characteristic;
    wirelessly broadcasting, from the peripheral locator reader, the filter criteria in a discovery request to in range peripheral locators coupled to computing devices, each of the computing devices being enabled to write data to a corresponding one of the peripheral locators;
    aggregating in the peripheral locator reader a list of discovered peripheral locators meeting the filter criteria;
    selecting in the peripheral locator reader at least one of the peripheral locators in the list, each selected peripheral locator upon being selected returning to the peripheral locator reader data stored therein and written by a correspondingly coupled one of the computing devices; and,
    interrogating by the peripheral locator reader selected ones of the peripheral locators to retrieve the data store therein.

2. The method of claim 1, wherein establishing filter criteria grouping different computing devices by common characteristic, comprises establishing filter criteria grouping different computing devices by common status.

3. The method of claim 1, wherein establishing filter criteria grouping different computing devices by common characteristic, comprises establishing filter criteria grouping different computing devices by common device type.

4. The method of claim 1, wherein establishing filter criteria grouping different computing devices by common characteristic, comprises establishing filter criteria grouping different computing devices by at least one of a common device owner, product code, company code and machine type/model.

5. The method of claim 1, further comprising illuminating a display element in each of the discovered peripheral locators.

6. The method of claim 1, further comprising illuminating a display element in the selected ones of the peripheral locators.

7. A computing device location data processing system comprising:
    a plurality of peripheral locators each configured for communicative coupling to a corresponding computing device; and,
    a peripheral locator reader configured for wireless communication with the peripheral locators, the peripheral locator reader comprising program code enabled to establish filter criteria grouping different computing devices by common characteristic, each of the computing devices being enabled to write data to a corresponding one of the peripheral locators, to wirelessly broadcast the filter criteria in a discovery request to in range ones of the peripheral locators, to aggregate a list of discovered peripheral locators meeting the filter criteria, to select at least one of the peripheral locators in the list, each selected peripheral locator upon being selected returning to the peripheral locator reader data stored therein and written by a correspondingly coupled one of the computing devices, and to interrogate selected ones of the peripheral locators to retrieve the data stored therein.

8. The system of claim 7, where each of the peripheral locators comprises:
    a wireless communications system;
    a microcontroller;
    memory; and,
    a host interface configured to permit a corresponding coupled one of the computing devices to write data to the memory.

9. The system of claim 8, further comprising a display element activatable to indicate discovery by the peripheral locator reader.

10. The system of claim 8, further comprising a display element activatable to indicate selection by the peripheral locator reader.

11. The system of claim 8, wherein the wireless communications system comprises one of a radio frequency identification (RFID) system, a bluetooth communications system, and an infrared communications system.

12. The system of claim 8, wherein the host interface comprises a universal serial bus (USB) interface.

13. The system of claim 8, wherein the host interface comprises a data bus.

14. A computer program product comprising a computer usable storage medium comprising a memory device embodying computer usable program code for computing device location, the computer program product comprising:
    computer usable program code for establishing in a peripheral locator reader filter criteria grouping different computing devices by common characteristic;
    computer usable program code for wirelessly broadcasting, from the peripheral locator reader, the filter criteria in a discovery request to in range peripheral locators coupled to computing devices, each of the computing devices being enabled to write data to a corresponding one of the peripheral locators;

computer usable program code for aggregating in the peripheral locator reader a list of discovered peripheral locators meeting the filter criteria;

computer usable program code for selecting in the peripheral locator reader at least one of the peripheral locators in the list, each selected peripheral locator upon being selected returning to the peripheral locator reader data stored therein and written by a correspondingly coupled one of the computing devices; and, computer usable program code for interrogating by the peripheral locator reader selected ones of the peripheral locators to retrieve the data store therein.

15. The computer program product of claim 14, wherein the computer usable program code for establishing filter criteria grouping different computing devices by common characteristic, comprises computer usable program code for establishing filter criteria grouping different computing devices by common status.

16. The computer program product of claim 14, wherein the computer usable program code for establishing filter criteria grouping different computing devices by common characteristic, comprises computer usable program code for establishing filter criteria grouping different computing devices by one of a common device type, product code, company code and machine type/model.

17. The computer program product of claim 14, wherein the computer usable program code for establishing filter criteria grouping different computing devices by common characteristic, comprises computer usable program code for establishing filter criteria grouping different computing devices by common device owner.

18. The computer program product of claim 14, further comprising computer usable program code for illuminating a display element in each of the discovered peripheral locators.

19. The computer program product of claim 14, further comprising computer usable program code for illuminating a display element in the selected ones of the peripheral locators.

* * * * *